United States Patent [19]

McMillen

[11] Patent Number: 4,623,996
[45] Date of Patent: Nov. 18, 1986

[54] PACKET SWITCHED MULTIPLE QUEUE NXM SWITCH NODE AND PROCESSING METHOD

[76] Inventor: Robert J. McMillen, 2508 E. Willow #104, Long Beach, Calif. 90806

[21] Appl. No.: 662,474

[22] Filed: Oct. 18, 1984

[51] Int. Cl.[4] .................... H04Q 11/04; H01H 67/00
[52] U.S. Cl. ................................ 370/60; 340/825.03; 370/61
[58] Field of Search ................... 370/60, 94, 92; 340/825.03, 825.04

[56] References Cited

U.S. PATENT DOCUMENTS

| | | | |
|---|---|---|---|
| 4,271,506 | 6/1981 | Broc et al. | 370/60 |
| 4,307,378 | 12/1981 | Clark | 370/60 |
| 4,475,188 | 10/1984 | Wilson et al. | 370/60 |
| 4,482,996 | 11/1984 | Wilson et al. | 370/60 |
| 4,484,326 | 11/1984 | Turner | 370/94 |
| 4,550,397 | 10/1985 | Turner et al. | 370/60 |

FOREIGN PATENT DOCUMENTS

| | | |
|---|---|---|
| 0014152 | 8/1980 | European Pat. Off. |
| 0020255 | 12/1980 | European Pat. Off. |
| 2549673 | 1/1985 | France |
| 59-135953 | 8/1984 | Japan |
| WO84/01077 | 3/1984 | PCT Int'l Appl. |

OTHER PUBLICATIONS

Switching Strategies in a Class of Packet Switching Networks, M. Kumar et al; The 10th Annual International Symposium on Computer Architecture 1983, Stockholm, Sweden; pp. 284–300.

The Hybrid Cube Network, R. J. McMillen et al; Distributed Data Acquisition, Computing & Control Symposium; Dec. 1980; pp. 11–22, (Fig. VI.2, p. 19).

L. Ciminiera and A. Serra, "LSI Implementation of Modular Interconnection Networks for MIMD Machines", 1980 *Int'l. Conf. Parallel Processing*, Aug. 1980, pp. 161–162.

D. M. Dias and J. R. Jump, "Analysis and Simulation of Buffered Delta Networks", *IEEE Trans. Computers*, vol. C-30, pp. 273–282, Apr. 1981.

A. C. Hung and M. Malek, "A 4×4 Modular Crossbar Design for the Multistage Interconnection Networks", *Real-Time Systems Symp.*, Dec. 1981, pp. 3–12.

J. H. Patel, "Processor-Memory Interconnections for Multiprocessors", 6th Annual Int'l. Symp. *Computer Architecture*, Apr. 1979, pp. 168–177.

U. V. Premkumar, R. Kapur, M. Malek, G. J. Lipovski and P. Horne, "Design and Implementation of the Banyan Interconnection Network in TRAC", *AFIPS 1980 Nat'l. Computer Conf.*, Jun. 1980, pp. 643–653.

(List continued on next page.)

*Primary Examiner*—Douglas W. Olms
*Assistant Examiner*—Frank M. Scutch, III

[57] ABSTRACT

A packet switching node which processes data packets containing routing tag signals indicative of the output port destination thereof and which routes these data packets to the specified output ports. A plurality of queue selectors are individually coupled between a plurality of input ports and a plurality of queue sets that comprise a plurality of queues which store and forward data packets applied thereto as a function of output port destination. Each of the plurality of queue selectors sort the data packets applied thereto in accordance with the output port destination thereof. The queues of each queue sets are coupled to different output arbitrators which control routing to a particular output port. The packet switching node eliminates the problem of contention between data packets arriving at an input port of the node whose destinations are different output ports. The packet switching node sorts applied data packets according to output port destination to reduce contention and hence has improved performance and higher throughput. The present invention also contemplates a method of processing applied data packets containing routing tag signals indicative of the output port destinations to which the data packets are to be applied. The method comprises sorting and storing the data packets in accordance with the routing tag signals, arbitrating among data packets that have been stored that contend for the same output port, and then routing the selected data packet to the output port identified in the routing tag signal.

6 Claims, 19 Drawing Figures

OTHER PUBLICATIONS

H. J. Siegel and R. J. McMillen, "The Multistage Cube: A Versatile Interconnection Network", *Computer*, vol 14, pp. 65-76, Dec. 1981.

R. J. McMillen, G. B. Adams, III, and H. J. Siegel, "Performance and Implementation of 4×4 Switching Nodes in an Interconnection Network for PASM", 1981 Int'l Conf. on Parallel Processing, Aug. 1981, pp. 229-233.

B. J. Smith, "Architecture and Applications of the HEP Multiprocessor Computer System", SPIE, vol. 298, Section on Real-Time Signal Processing IV, Aug. 1981 pp. 241, 248.

Herzog: Message-Switching Networks with Alternate Routing, Jun. 13-20, 1973, pp. 415/1-415/8, Proceedings of the International Teletraffic Congress, Stockholm, Proc. 7, Part 2, Swedish Communications 1973 (Stockholm, Sweden).

Parker et al: The Gamma Network: A Multiprocessor Interconnection Network with Redundant Paths, pp. 73-80, Conference Proceedings: the 9th Annual Symposium on Computer Architecture, Apr. 26-29, 1982, Austin, Texas.

P. N. Jean, S. C. Crist, M. Arozullah, "Multi-Microprocessor Based Architecture for a Space Borne Packet Switch", pp. 139-141; COMCON 80, Feb. 25-28, 1980, 20th Computer Society International Conference (San Francisco, Calif.

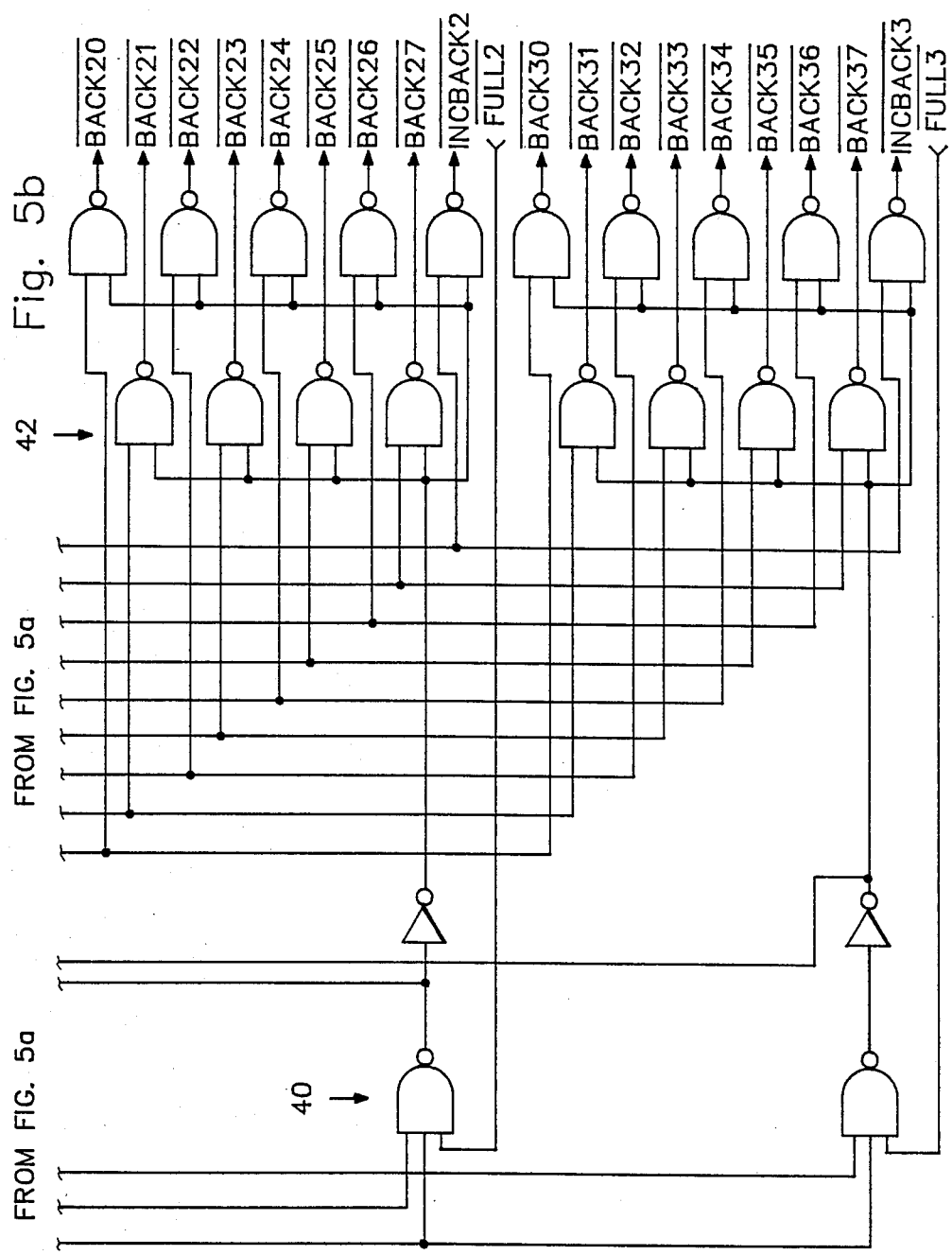

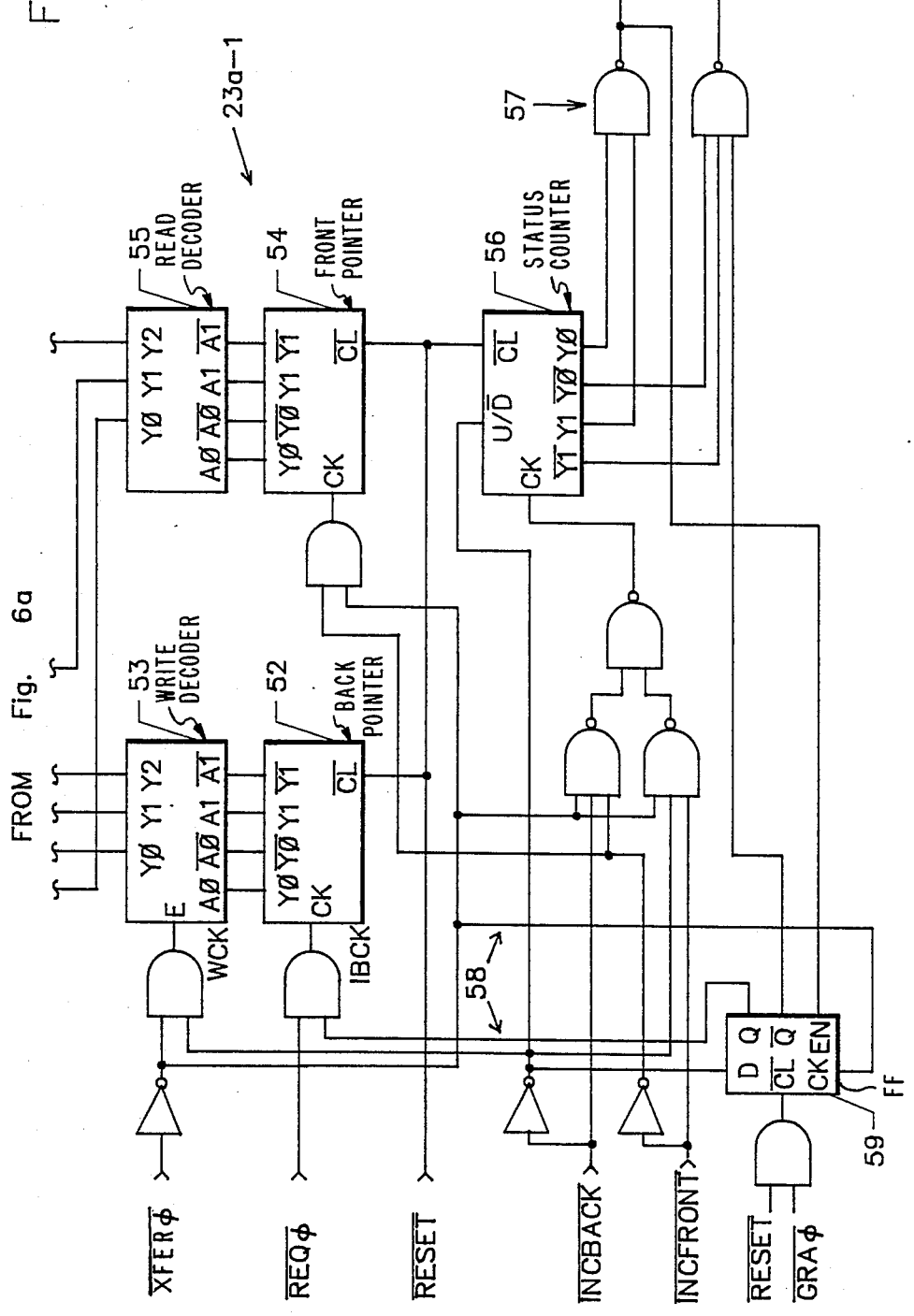

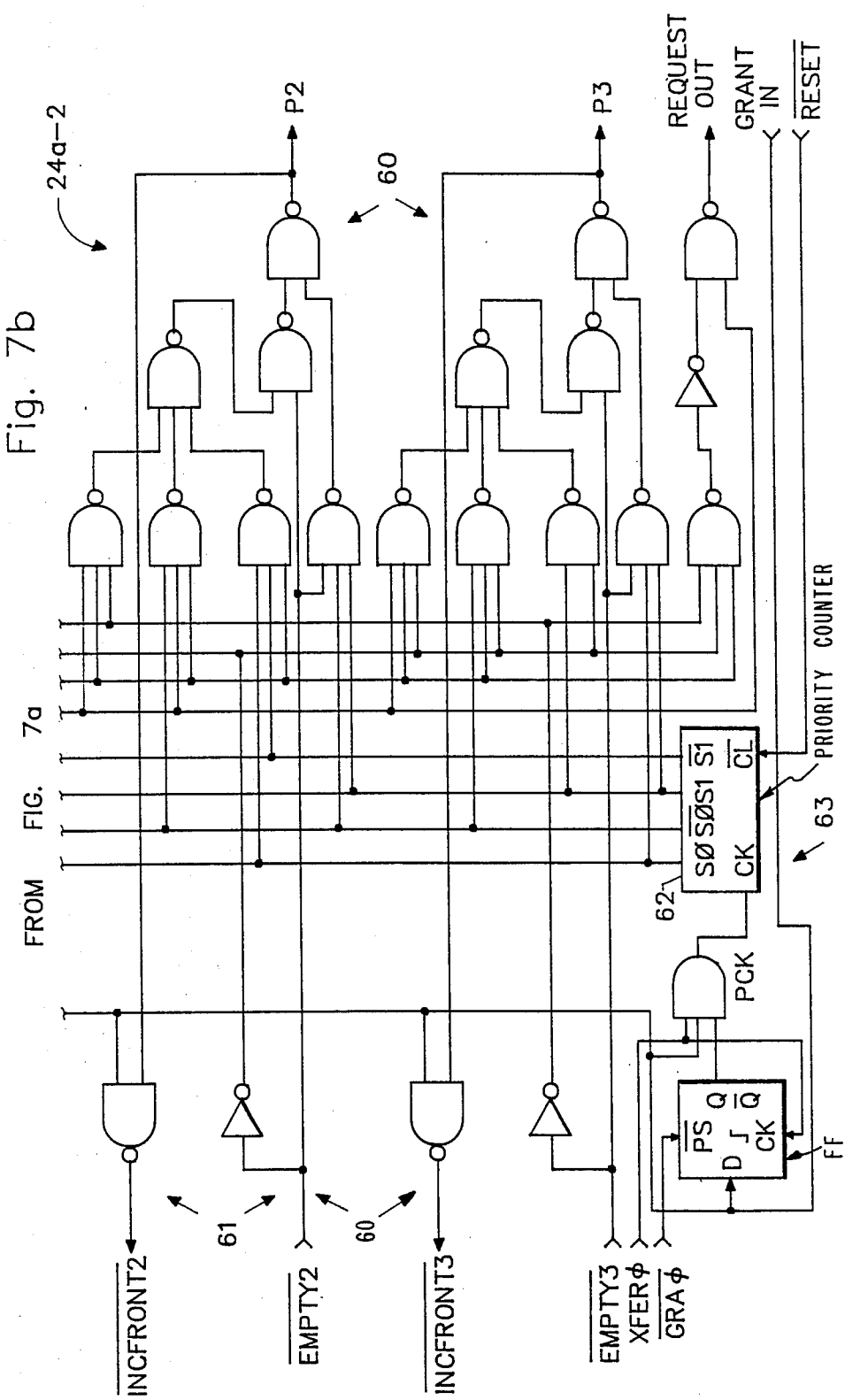

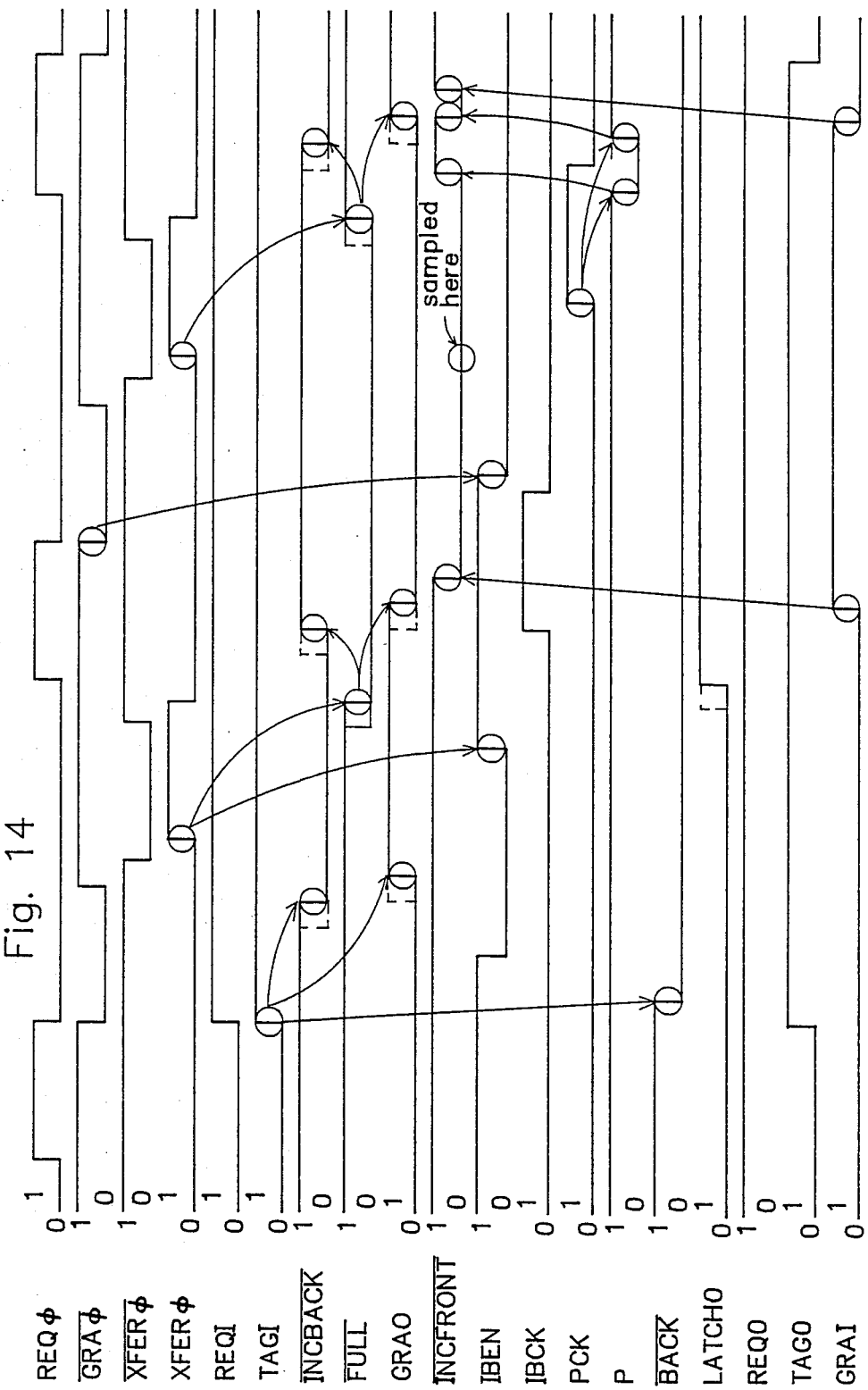

PACKET SWITCHED MULTIPLE QUEUE NXM SWITCH NODE AND PROCESSING METHOD

BACKGROUND OF THE INVENTION

The present invention relates generally to packet switching devices employed in multi-processor and parallel computer systems, and digital communications equipment, and the like, and more particularly to packet switching devices which utilize pluralities of queue sets individually coupled to the input ports thereof which are employed to sort and store data packets in order to reduce output port contention between data packets arriving at the same input port.

One developing area of computer technology involves the design and development of large-scale, multi-processor-based distributed and parallel computer systems. Typical of these classes of computer systems and architectural approaches are the single instruction stream, multiple data stream (SIMD) computer architecture and the multiple instruction stream, multiple data stream (MIMD) computer architecture.

A SIMD computer typically comprises a control unit, N processors, N memory modules and an interconnection network. The control unit broadcasts instructions to all of the processors, and all active processors execute the same instruction at the same time. Each active processor executes the instruction on data in its own associated memory module. The interconnection network provides a communications facility for the processors and memory modules.

A MIMD computer typically comprises N processors and N memories, and each processor can execute an independent instruction stream. Each of the processors may communicate to any other processor. Similar interconnection networks may be employed in the MIMD computer.

Various interconnection networks may be employed to interconnect processors and memories employed in either type of computer system. These interconnection networks include delta networks, omega networks, indirect binary n-cube networks, flip networks, cube networks and banyan networks, for example.

The above-cited networks are discussed in some detail in the following publications: "LSI implementation of modular interconnection networks for MIMD machines," 1980 *Int'l. Conf. Parallel Processing*, Aug. 1980, pp. 161-162; "Analysis and simulation of buffered delta networks," *IEEE Trans. Computers*, Vol. C-30, pp. 273-282, April 1981; "Processor-memory interconnections for multiprocessors," *6th Annual Int'l. Symp. Computer Architecture*, April 1979, pp. 168-177; "Design and implementation of the banyan interconnection network in TRAC," *AFIPS 1980 Nat'l. Computer Conf.*, June 1980, pp. 643-653; "The multistage cube: a versatile interconnection network," *Computer*, Vol. 14, pp. 65-76, Dec. 1981; "The hybrid cube network," *Distributed Data Acquisition, Computing and Control Symp.*, Dec. 1980, pp. 11-22; and "Performance and implementation of 4×4 switching nodes in an interconnection network for PASM," 1981 Int'l Conf. on Parallel Processing, Aug. 1981, pp. 229-233.

Several types of data switching techniques may be employed to transfer data in SIMD and MIMD computers, and the like, including packet switching, message switching, time-division circuit switching or space-division circuit switching. Packet switching involves sending one or more words of data at time through the system.

Conventional packet switching interconnection networks have a well-known problem involving the speed of transmission of information through the network. Conventional designs have typically employed a single queue coupled to each input port of the network to store and forward data packets to all the output ports. In the single queue system, a contention problem occurs due to the fact that a data packet destined for output port 2, for example, is blocked from exiting through that port because a data packet destined for output port 1 is physically ahead of it in the queue and has not yet exited through port 1. This contention problem causes unnecessary delays in system throughput.

One packet switching node design that attempts to alleviate this problem is disclosed in the article "The hybrid cube network," cited above. The network of interest is shown in FIG. VI.2 on page 12. This Figure shows a switch node comprising two input ports, each of which is coupled through separate queue selection logic to two queues, identified as straight and exchange. The outputs of the two queues of each pair of queues is coupled through queue selection and switch logic to two output ports.

A straight/exchange signal is included in the data packets processed by the circuit which allows the packets to be gated directly into the appropriate queue during the transfer cycle. The data packets are gated through the second queue selector and switch to the appropriate output port by control logic in the control section. It is stated that a 4 to 1 multiplexer could be employed in place of the second queue selector and switch in order to gate the data packets to the appropriate output port.

The operation of this switch node is somewhat similar to the operation of the present invention. However, as is discussed hereinbelow, the structure and operation of the present invention is different than this switch node. A principal difference between the straight/exchange switch node and the present invention is that the former connects any queue output to any output port and, as will be disclosed below, the latter connects each queue output to exactly one output.

SUMMARY OF THE INVENTION

In order to overcome the shortcomings of prior art packet switching nodes, the present invention provides for a packet switching node which eliminates the problem of contention between data packets arriving at an input port of the node whose destinations are different output ports. The present invention also provides for a packet switching node which sorts applied data packets according to output port destination to reduce contention and improve system performance and throughput.

In order to obtain the above-mentioned features and advantages, the present invention provides for a packet switching node which processes applied data packets containing routing tag signals indicative of the output port destination to which the data packets are to be applied. The packet switching node comprises a plurality of input ports and a plurality of output ports. A plurality of queue selectors are individually coupled to corresponding ones of the plurality of input ports. Each of the plurality of queue selectors are adapted to route data packets applied to each of the input ports in accordance with the output port destination of the data packets.

A plurality of queue sets are individually coupled to corresponding ones of the plurality of queue selectors. Each of the queue sets comprise a plurality of queues for storing and forwarding data packets applied thereto as a function of output port destination. A plurality of output arbitrators are individually coupled between corresponding ones of the plurality of output ports and the respective queue of each of the queue sets which store and forward data packets whose destinations are the corresponding output port. The output arbitrators are adapted to transfer the data packets stored in the queues to the corresponding output port in accordance with a predetermined priority arbitration scheme.

The queue selectors comprises queue selection logic coupled between each of the input ports and the corresponding plurality of queue sets. The queue selection logic is adapted to route applied data packets arriving at an input port to corresponding ones of the queues in accordance with the routing tag signals. The output arbitrators comprise output arbitration logic coupled between each output port and respective queues of each of the plurality of queue sets. The output arbitration logic is adapted to process data packets whose destinations are the output port coupled thereto and apply the data packets associated with that output port stored in each of said respective queues to that output port in accordance with the predetermined priority arbitration scheme.

In operation, the packet switching node of the present invention may be employed in a multi-processor computer system, such as an instruction flow computer, or the like. Such a computer system comprises a plurality of processors and a plurality of memories which may be accessed by any of the processors. The packet switching node of the present invention may be employed as part of a communications link between the processors and memories.

By way of example, the system may comprise two processors and two memories. Accordingly, a four input, four output switch node would be employed to transfer signals through the system. Each processor and each memory is connected to an input port and an output port of the switch node. During one processing cycle, for example, processor 1 wishes to store data in memory 1. Processor 1 is connected to input and output port 0 and memory 1 is connected to input and output port 2. Processor 1 generates a routing tag signal indicating the destination (output port 2) which is part of the data packet. The data packet enters the packet switching node at input port 0. The queue selector reads the routing tag signal and passes the data packet to the queue in the queue set coupled thereto which stores and forwards data packets to the output arbitrator coupled to output port 2. This data packet is then passed through the output arbitrator to output port 2 based upon the priority arbitration scheme and finally reaches memory 1.

To better understand how the present invention eliminates contention, assume that several processing cycles have occurred and that most of the queues in each queue set have data packets stored therein. Again consider that processor 1 wishes to store data in memory 1. It generates a routing tag signal which is read by the queue selector coupled to input port 0. The data packet is stored in the appropriate queue which routes data packets to the output arbitrator for output port 2.

Now let us assume that processor 1 wishes to store data in memory 2 which is connected to output port 3. The appropriate routing tag signal is generated and the data packet enters at input port 1. This data packet is then placed into the queue associated with output port 3 and not physically behind the previous data packet whose destination is output port 2. Hence the second data packet is not blocked from being routed to memory 2 by the first data packet.

In general, each of the queue selectors route data packets destined for different output ports to different queues in the queue set coupled thereto. This eliminates contention between packets at this stage of processing. The only contention that exists is at the output arbitrators, which must decide the order in which the data packets routed thereto from all the input ports should be processed. This is accomplished by the priority arbitration scheme implemented thereby.

The present invention comprises an N by M switch node. The design of the packet switching node of the present invention employs a queue for each input/output port pair, which results in a total of MxN queues. One advantage of this type of queue arranagement allows incoming data packets to be sorted according to their destination, which reduces contention among packets and improves performance.

The packet switching node is a flexible building block which can be implemented in a bit sliced fashion. Therefore, networks can be constructed having arbitrary size and path width with a great variety of topologies. The present invention is suitable for uses ranging from one module in a single computer to interconnect registers and other sub-structures to hundreds of modules forming a network for a large scale parallel processing system. This invention may be employed in any application requiring high speed, digital, packet switched communication.

The present invention also contemplates a method of processing applied data packets containing routing tag signals indicative of the output port destinations to which the data packets are to be applied. The method processes the data packets in order to route them to the appropriate output ports. The method comprises the steps of sorting the data packets in accordance with the routing tag signals contained therein. The second step involves storing the data packets in predetermined queues associated with respective ones of each of the output ports in accordance with the routing tag signals. The next step comprises arbitrating, or selecting, among data packets that have been stored in the queues that contend for the same output port. The final step involves applying, or routing, the selected data packet to the output port identified in the routing tag signal.

Although the present invention is discussed with reference to its use with computer systems and architectures, it is not limited to this application. The present invention may also be used in applications involving the communications field. In particular, interconnection networks employing the present invention may be used to connect telephone systems that communicate both data and voice information by way of data packets.

BRIEF DESCRIPTION OF THE DRAWINGS

The various objects and features of the present invention may be more readily understood with reference to the following detailed description taken in conjunction with the accompanying drawings, wherein like reference numerals designate like structural elements, and in which:

FIGS. 5a and 5b show a design of queue selector logic for use in the packet switching node of FIG. 3;

FIGS. 6a and 6b show a design of a queue for use in the packet switching node of FIG. 3;

FIGS. 7a and 7b show a design of output arbitration control logic for use in the packet switching node of FIG. 3;

FIGS. 13 and 14 show timing diagrams for the packet switching node of FIG. 3.

DESCRIPTION OF THE PREFERRED EMBODIMENT

Figure 1:
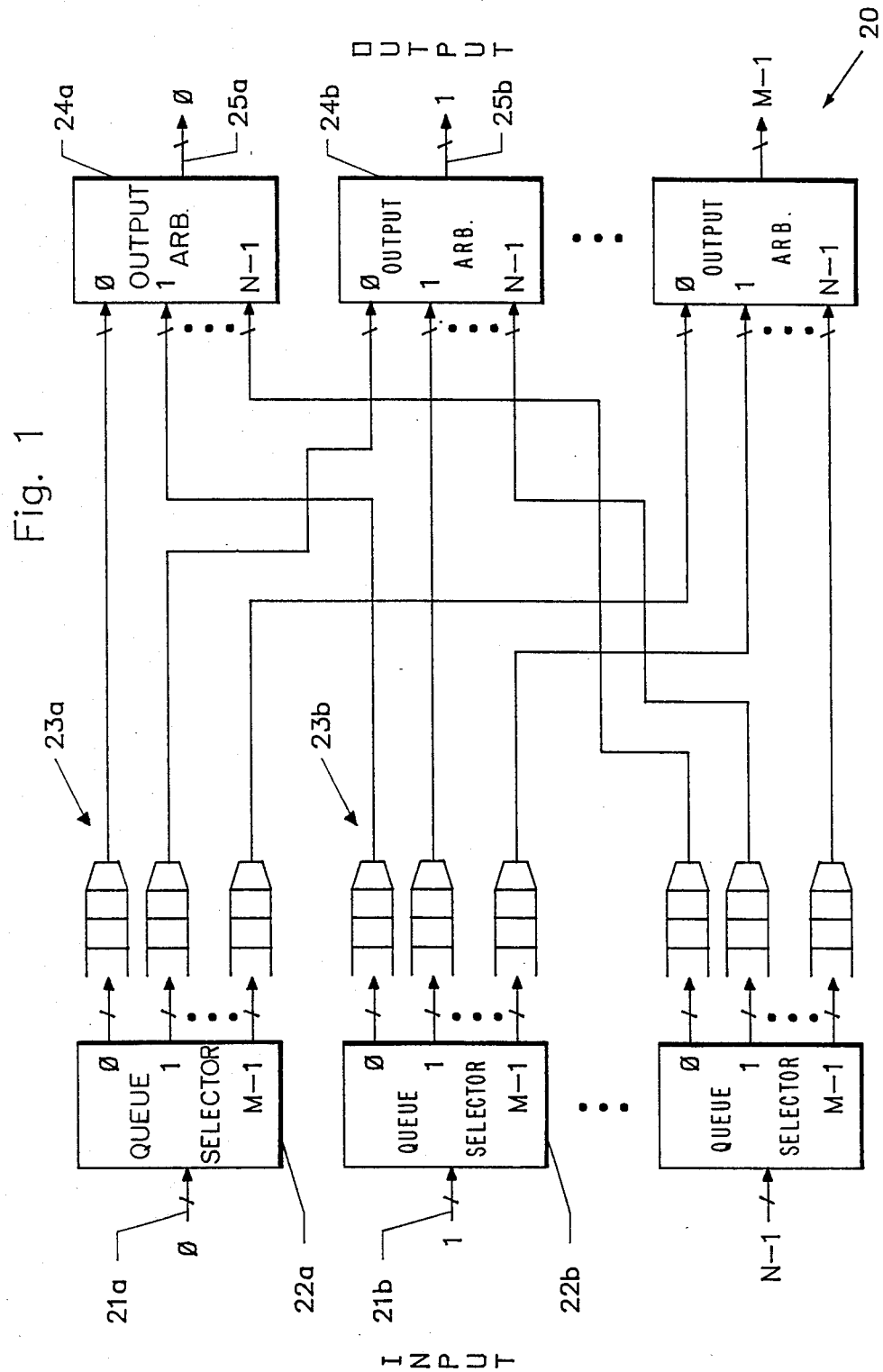
FIG. 1 illustrates a generalized embodiment of a packet switching node in accordance with the principles of the present invention.

Referring to FIG. 1, there is shown a generalized embodiment of a packet switching node 20 in accordance with the principles of the present invention. The packet switching node 20 comprises a plurality of input ports 21 which are individually coupled to inputs of a plurality of queue selectors 22. Each of the queue selectors 22 has a plurality of outputs which are individually coupled to separate queues of a corresponding queue set 23. A plurality of output ports 25 are individually coupled to outputs of a plurality of output arbitrators 24. Each of the output arbitrators 24 has a plurality of inputs which are coupled to predetermined outputs of queues contained in each of the queue sets 23.

The packet switching node 20 is adapted to process applied data packets which contain data words and routing tag signals indicative of the output port destination to which the data packets are to be routed. Each of the queue selectors 22 comprise queue selection logic which is designed to route applied data packets arriving at the input port to corresponding ones of the queues in the queue set coupled thereto in accordance with the routing tag signals. Each of the queue selectors 22 has a plurality of outputs which correspond to each of the output ports 25. Each of these outputs are individually coupled to one queue of its associated queue set 23. Therefore, each queue set is adapted to process data packets arriving at its input port and destined for any of the output ports 25.

Each of the output arbitrators 24 have a plurality of inputs which correspond to each of the input ports 21. Each input of a particular output arbitrator is individually coupled to the output of one queue of each of the queue sets 23 which processes data packets whose destination is the output port 25 to which the particular output arbitrator 24 is coupled. Therefore, all input ports 21 are coupled to all output ports 25. Each of the output arbitrators 24 comprise output arbitration logic which processes data packets arriving from all the plurality of input ports in order to select which of the data packets is to be passed from the output port 25 coupled thereto. This selection process is performed by a predetermined priority arbitration scheme implemented by the output arbitration logic.

In particular, the first queue selector 22a has its plurality of outputs coupled to respective queues of a first queue set 23a. The respective outputs of the queues of the first queue set 23a are coupled in a one-to-one manner to individual inputs of each of the output arbitrators 23. Hence, the first queue is coupled to the first output arbitrator 24a, the second queue to the second output arbitrator 24b, and so on. Similarly, the second queue set 23b coupled to the second queue selector 22b, has its queues connected to different inputs of each of the output arbitrators 24. The same connection scheme exists for all queue selectors and queue sets employed in the packet switching node 20.

As shown in FIG. 1, the packet switching node 20 comprises an arbitrary number of input and output ports 21, 25. FIG. 1 shows the generality of the invention by indicating that there may be N input ports 21 and M output ports 25. A specific embodiment of this node incorporating four input ports and four output ports is described hereinbelow with reference to FIG. 2.

In operation, and by way of example, the packet switching node of the present invention may be employed in a multi-processor computer system, such as an instruction flow computer, or the like. Such a computer system comprises a plurality of processors and a plurality of memories which may be accessed by any of the processors. The packet switching node 20 provides a communications link between the processors and memories.

Assume that processor 1 is connected to input port 21a and memory 1 is connected to output port 25a. For example, processor 1 wishes to store data in memory 1. Processor 1 generates a routing tag signal indicating the destination (memory 1) which is part of the data packet. The data packet enters the packet switching node 20 at input port 21a. The first queue selector 22a reads the routing tag signal and the logic circuits therein places the data packet in a queue of the first queue set 23a which routes data packets to the first output arbitrator 24a coupled to output port 25a. This data packet is then passed to memory port 1 based upon the priority arbitration scheme implemented by the output arbitration logic.

The packet switching node 20 is designed to reduce contention between data packets processed by it. To better understand how the packet switching node 20 reduces contention, assume that several processing cycles have occurred and that most of the queues in each queue set 23 have data packets stored therein. Again consider that processor 1 wishes to store data in memory 1. It generates a routing tag signal which is read by the first queue selector 21a coupled to input port 21a. The data packet is stored in the appropriate queue of the first queue set 23a which routes data packets to the first output arbitrator 24a for output port 25a.

Now let us assume that processor 1 wishes to store data in memory 2 which is connected to output port 25b. The appropriate routing tag signal is generated and the data packet enters at input port 21a. This data packet is then placed into the queue associated with output port 25b and not physically behind the previous data packet whose destination is memory 1. Hence the second data packet is not blocked from being routed to memory 2 by the first data packet.

Accordingly, each of the queue selectors 21 route data packets destined for different output ports into different queues of its associated queue set 23. This reduces contention between packets at this stage of processing. The only contention that exists is at an output arbitrator 24, which must decide the order in which the data packets should be processed. This is accomplished by the priority arbitration scheme implemented in the output arbitration logic.

The particular priority arbitration scheme implemented by the output arbitrators 24 may be one commonly known as a round robin priority scheme. Statistically, this priority scheme gives each data packet an equal probability of being selected. However, in certain instances, this scheme may be modified by having the output arbitration logic designed such that the packet with the highest priority retains its priority until it exits the switching node 20. Also, sooner or later, every data packet is given the highest priority. This scheme provides a means by which every data packet is guaranteed service and hence will exit the switching node 20. The logic associated with this priority scheme will be discussed in more detail with respect to FIG. 7 hereinbelow.

Both the queue selectors 22 and the output arbitrators 24 are adapted to implement a predetermined handshaking protocol. This protocol is required in order that no data is lost during the transmission cycle through the node 20. Handshaking protocols are well known in the computer art and will not be discussed in detail herein. However, the logic that implements the protocol in both the queue selectors 22 and output arbitrators 24 will be discussed in some detail with reference to FIGS. 5 and 7 hereinbelow. This handshaking protocol feature of the present invention allows multistage interconnection networks to be designed utilizing the switching node as building blocks.

Figure 2:
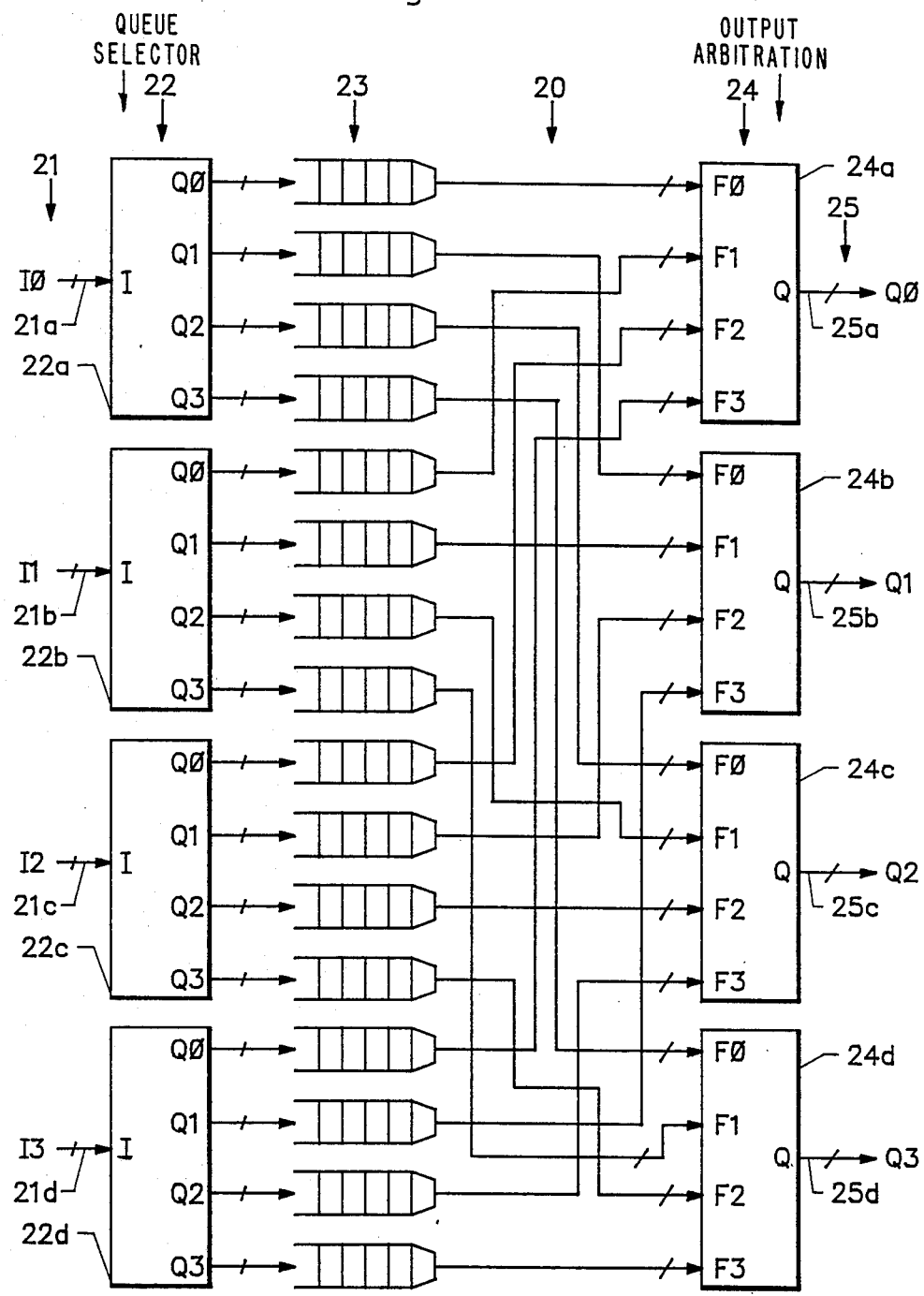
FIG. 2 illustrate a four input, four output implementation of the packet switching node of FIG. 1.
Figure 3A:
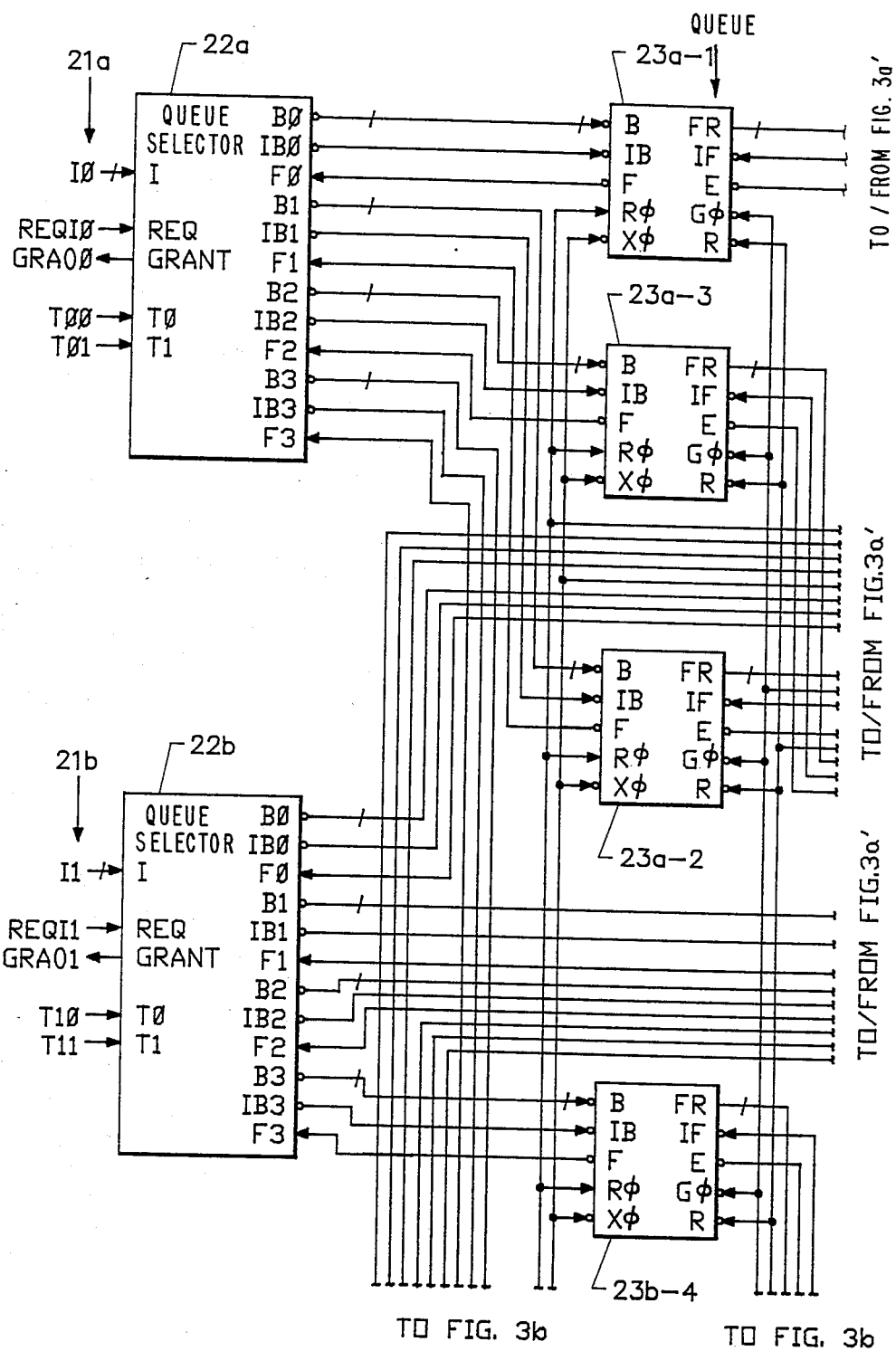
FIGS. 3a and 3b show a detailed diagram of the packet switching node of FIG. 2.
Figure 3A:
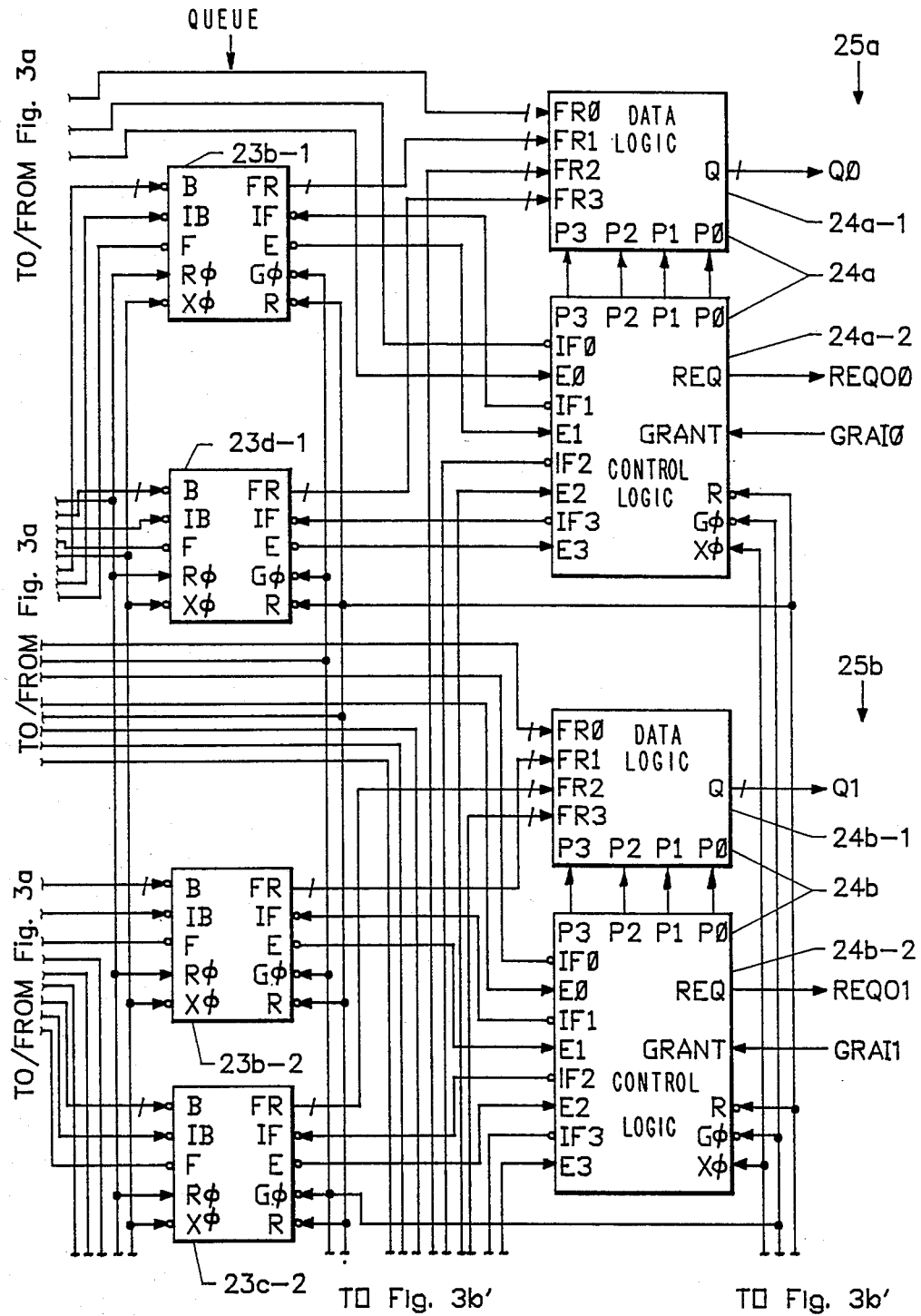
Figure 3B:
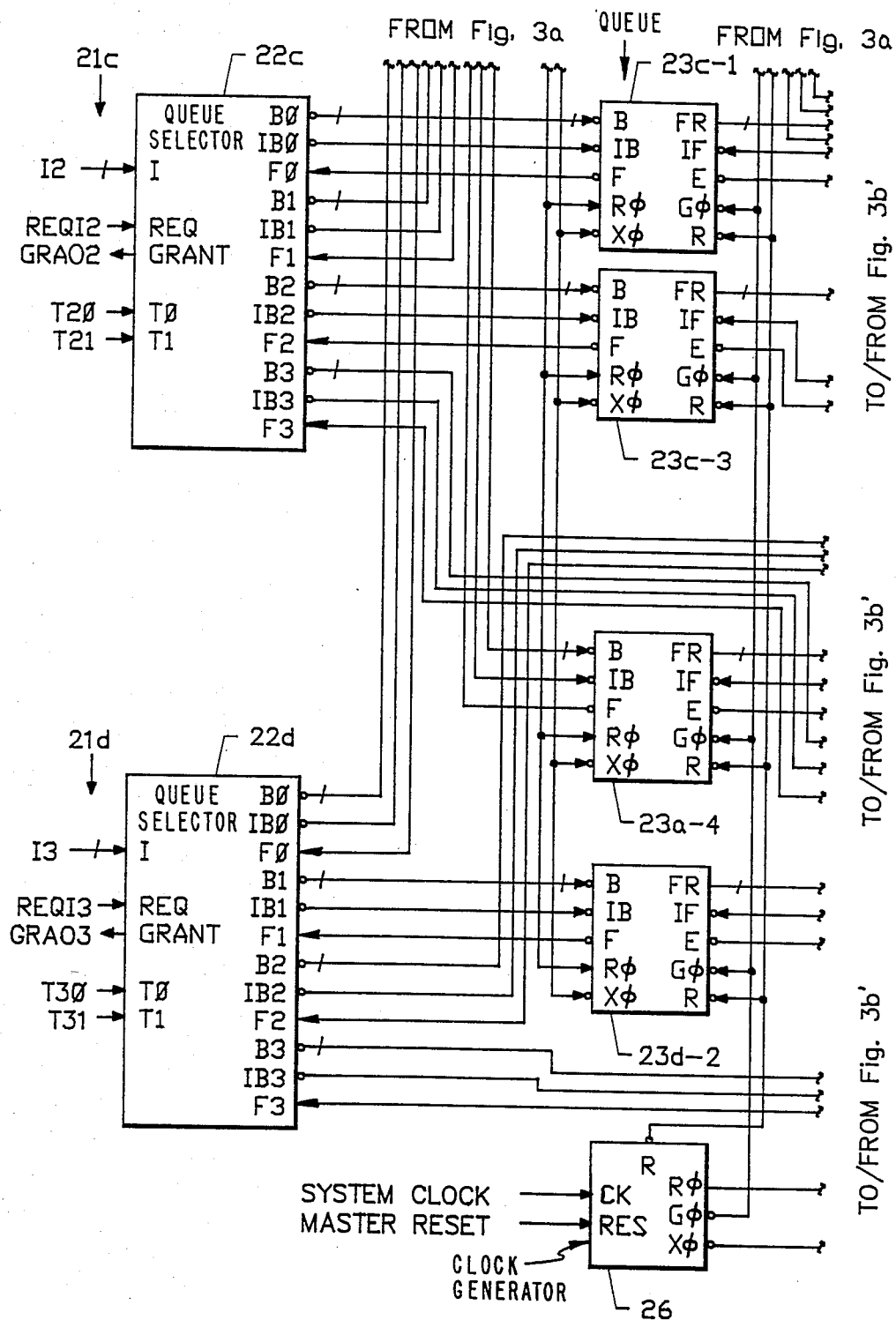
Figure 3B:
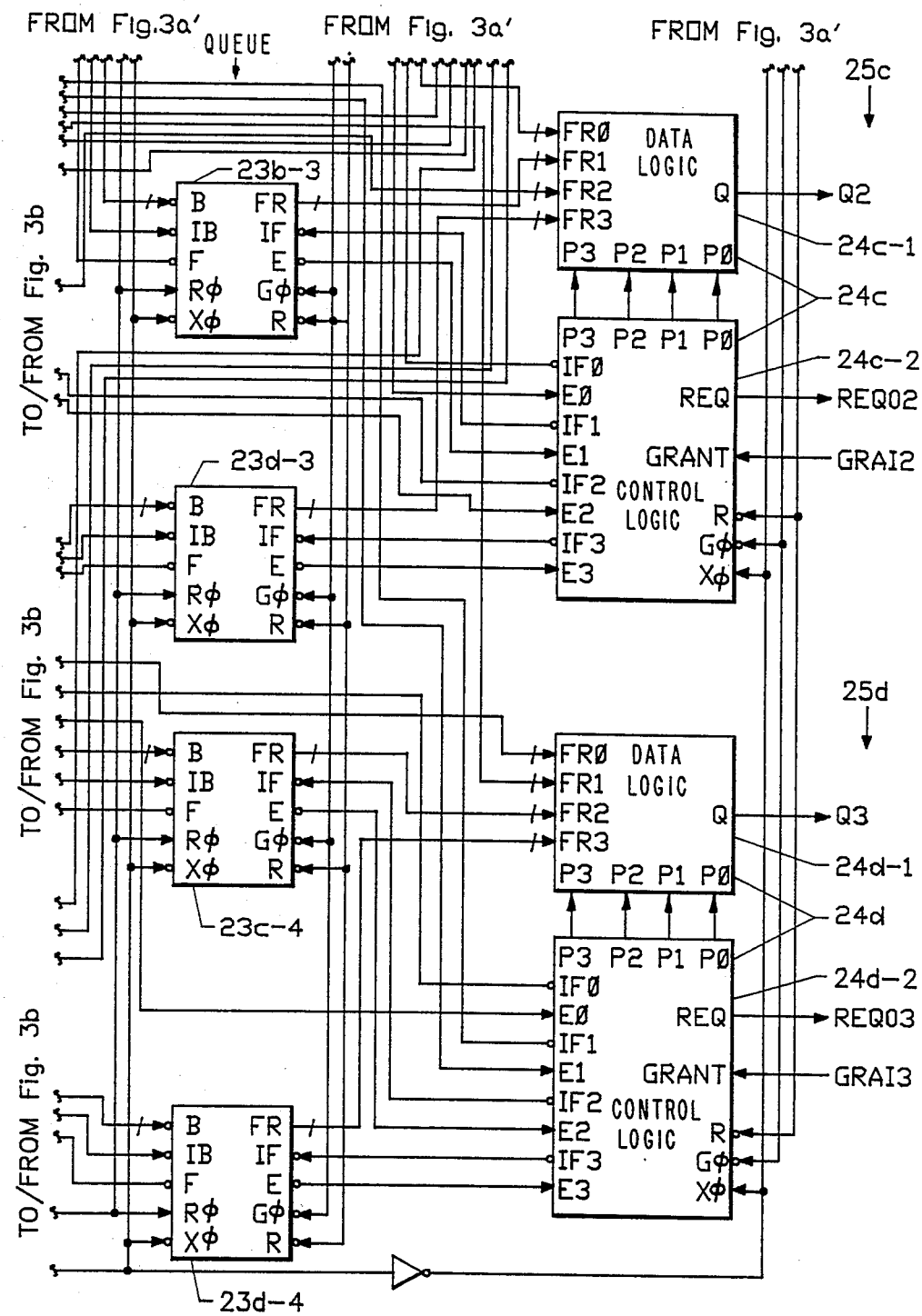

Referring now to FIG. 2, a four input, four output implementation of the packet switching node of FIG. 1 is shown. This packet switching node 20 comprises four input ports 21, four queue selectors 22, four queue sets 23, four output arbitrators 24 and four output ports 25. Each of the queue sets 23 comprise four queues which are coupled between outputs of their respective queue selectors 22 and the inputs of each of the four output arbitrators 24.

Referring to FIG. 3, a detailed block diagram of the packet switching node 20 of FIG. 2 is shown. FIG. 3 is comprised of FIGS. 3a and 3b, which should be placed adjacent to each other to obtain the complete drawing. This node comprises input ports 21a–d, queue selectors 22a–d, queue sets 23a–d comprised of four queues 23a–1 to 23a–4, etc., four output arbitrators 24a–d and four output ports 25a–d. In addition, a clock generator 26 is coupled to the various components of the node 20. Each of the components are shown illustrating the signal lines connected to other components of switching node 20. Each of the four queue selectors 22 is shown as an individual block. Each queue of a particular queue set 23 is shown as an individual block. Each output arbitrator 24 is shown as two blocks comprising data logic 24a–1 to 24d–1 and control logic 24a–2 to 24d–2.

Each of the components comprising the packet switching node 20 of FIG. 3 are illustrated in detail in FIGS. 4 through 8. A detailed discussion of the design and construction of these circuits will be dispensed with due to the straightforward design thereof. However, components whose design or operation is not well known will be described in detail. It is to be understood that these circuits are illustrative of but a few of the many possible logic circuits which implement the desired logic equations and decision-making algorithms embodied therein.

Figure 4:
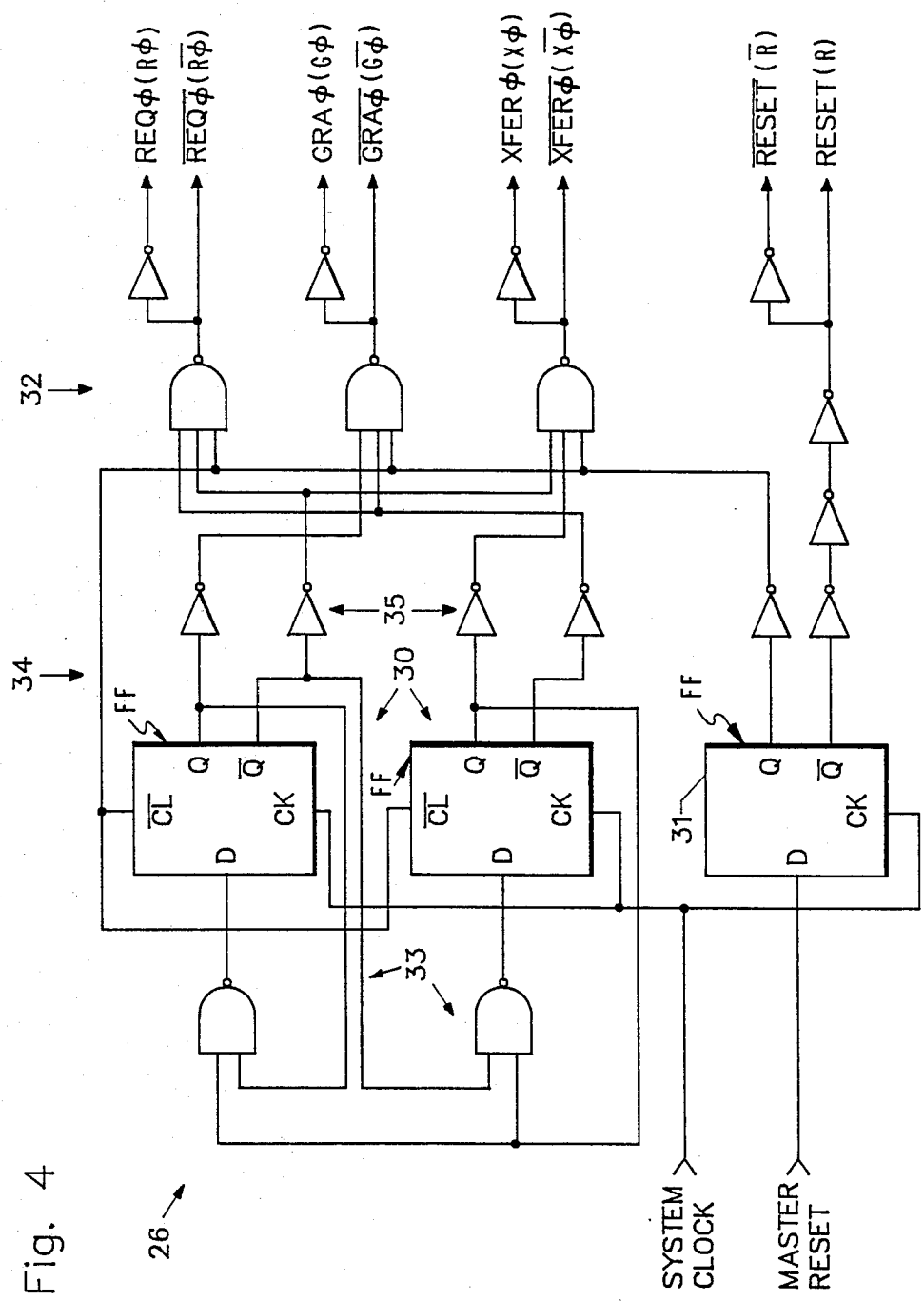
FIG. 4 shows a design of a clock generator for use in the packet switching node of FIG. 3.

FIG. 4 illustrates the design of a clock generator 26 for use in the packet switching node 20 of FIG. 3. The various input and output lines and signal identifications delineated in FIG. 4 correspond to signal lines identified in FIG. 3 described above and FIGS. 5 through 8. The clock generator 26 is comprised of a divide-by-three counter 34 coupled to a decoder 32 and a reset flip-flop 31. The divide-by-three counter 34 is comprised of flip-flops 30, feedback gates 33 and buffers 35. In operation, the counter 34 generates clock signal outputs in the sequence 00, 01,10,00, . . . These signals are converted into three clock phases, REQ∅, GRA∅, and XFER∅ by the decoder 32. The reset flip-flop 31 synchronizes the MASTER RESET signal with the clock signal to produce a synchronous RESET signal for the system.

Figure 5A:
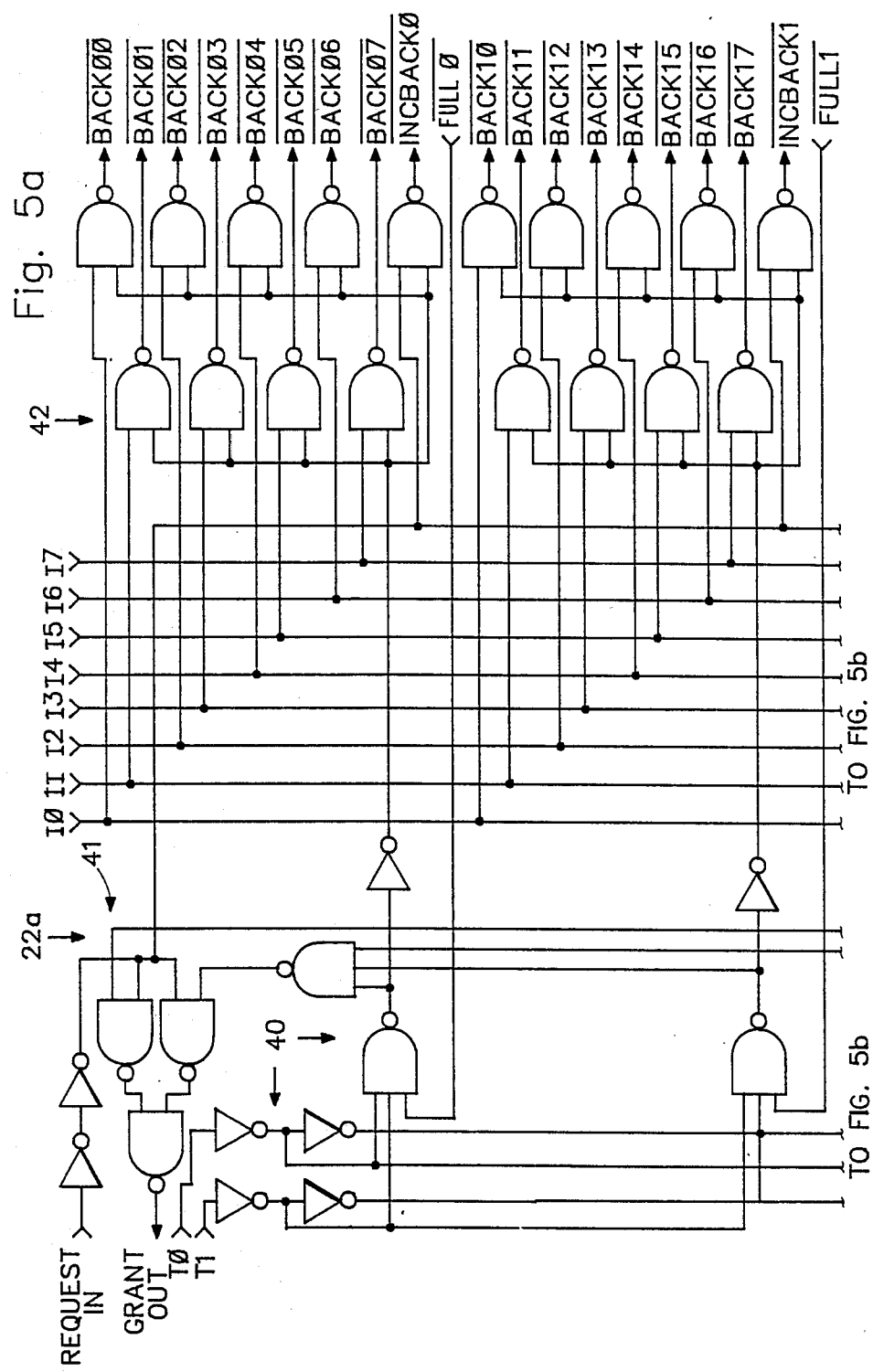

FIG. 5 is comprised of FIGS. 5a and 5b, which should be joined to form the complete drawing, as illustrated with reference to FIG. 3 above. FIG. 5 illustrates the design of queue selector logic associated with each of the queue selectors 22 of FIG. 3. Again, each of the signal lines is identified and corresponds to the signal lines of the other components illustrated in FIGS. 4 through 8. The queue selector logic comprises a tag decoder 40, grant generation logic 41 and an eight-input, one-to-four demultiplexer 42. In operation, this logic receives a request signal, two tag bits and eight data bits at the beginning of the REQ0 clock which comprises the request phase. The tag signals are decoded by the tag decoder 40 which selects one of the four queues using the one-to-four demultiplexer 42. If the selected queue is not full, indicated by FULLi from the i-th queue, then the one-to-four demultiplexer 42 is enabled and a GRANT signal is produced by the grant generation logic 41. If the selected queue is full, then no GRANT signal is given.

Figure 6A:
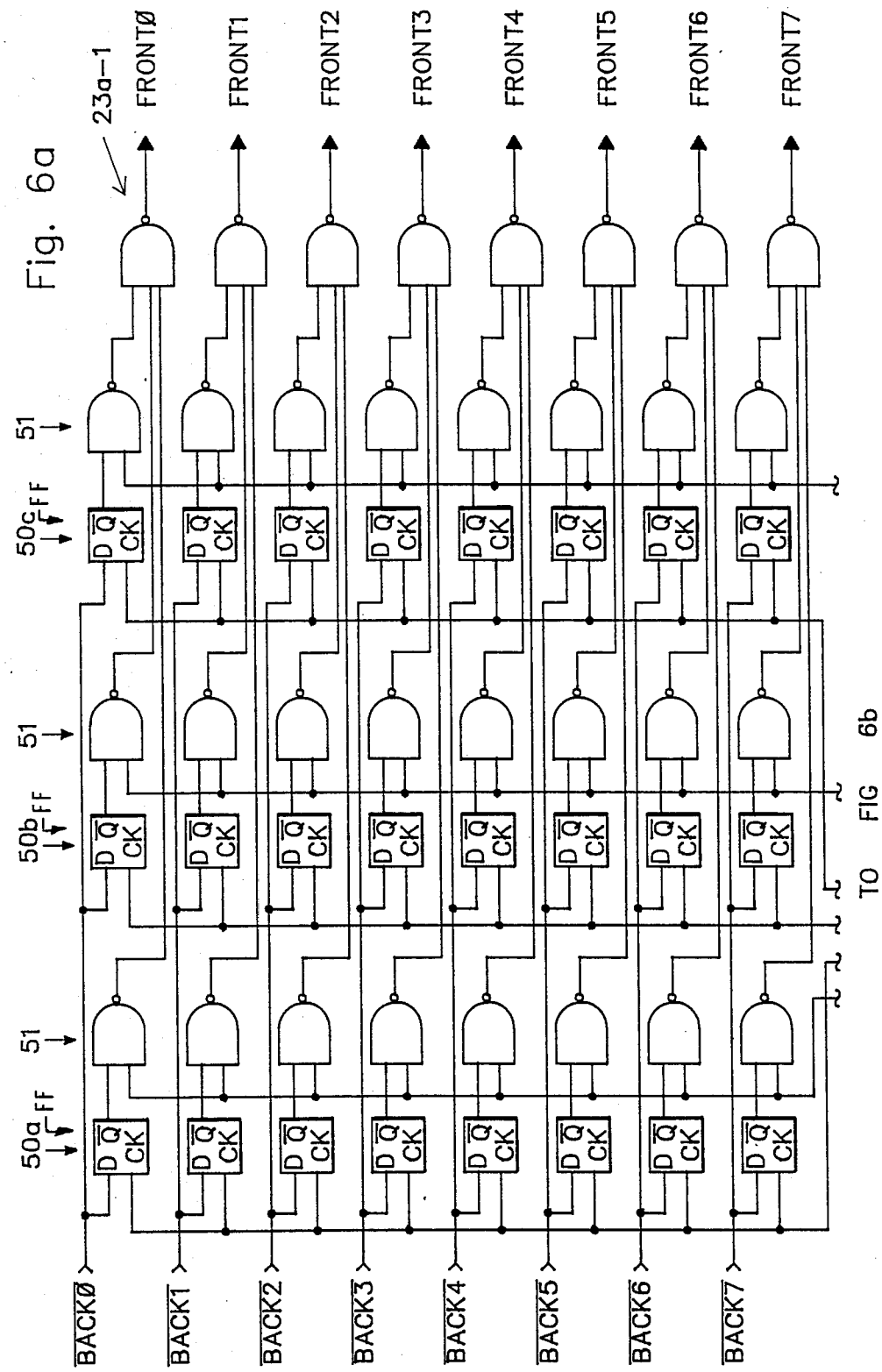

FIG. 6 is comprised of FIGS. 6a and 6b and should be joined in a manner similar to FIG. 3 in order to obtain the complete drawing. FIG. 6 illustrates the design of each queue shown in FIG. 3. Three data packets may be stored in storage registers 50a–c. The remainder of the logic controls the operation of the queue. This logic is comprised of a back pointer 52 coupled to a write decoder 53, and a front pointer 54 coupled to a read decoder 55. These components are coupled to an eight-input multiplexer 51, a status counter 56 which is coupled to a status decoder 57, counter enable logic 58, and timing flip-flops 59.

Each queue, for example queue 23a-1, operates as follows. Data packets are received at the back of the queue from the one-to-four demultiplexer 42 in the queue selector 22. If the queue 23a-1 is not full, as indicated by the status decoder 57, a data packet will be written into one of the registers 50 pointed to by the back pointer 52. The selected register 50 is enabled by the write decoder 53 during the transfer phase signaled by the XFER∅ clock. Upon receipt of the next request, the back pointer is incremented if enabled by the timing flip-flop 59b which controls the increment operation. A write clock pulse sent to the write decoder 53 is terminated by the timing flip-flop 59a. It is to be pointed out that this timing flip-flop is only needed if the registers 50 are level triggered. It may be removed from the circuitry if they are edge triggered.

Each time a data packet is received, the status counter 56 is incremented. Each time a data packet is transmitted, the status counter 56 is decremented. The operation performed is determined by the counter enable logic 58 which examines an increment back INCBACK signal from the queue selector 22 and the increment front INCFRONT signal from the output arbitrator 24. If the status counter 56 is 00, then the status decode logic 57 indicates the empty state and if the status counter 56 is 11, then the status decoder logic 57 indicates the full state.

Whenever the status decoder 57 indicates that the queue is not empty, a signal is sent to the output arbitrator 24 which requests to output a data packet from the front of the queue to the corresponding output port 25. If the output arbitrator 24 selects this queue and the data packet is transmitted, then the INCFRONT signal will be activated and during the transfer phase the front pointer 54 will be incremented. The read decoder 55 decodes the signals from the front pointer 54 and enables the output from the selected register 50 to appear at the front of the queue using the 8 -input multiplexer 51.

Figure 7A:
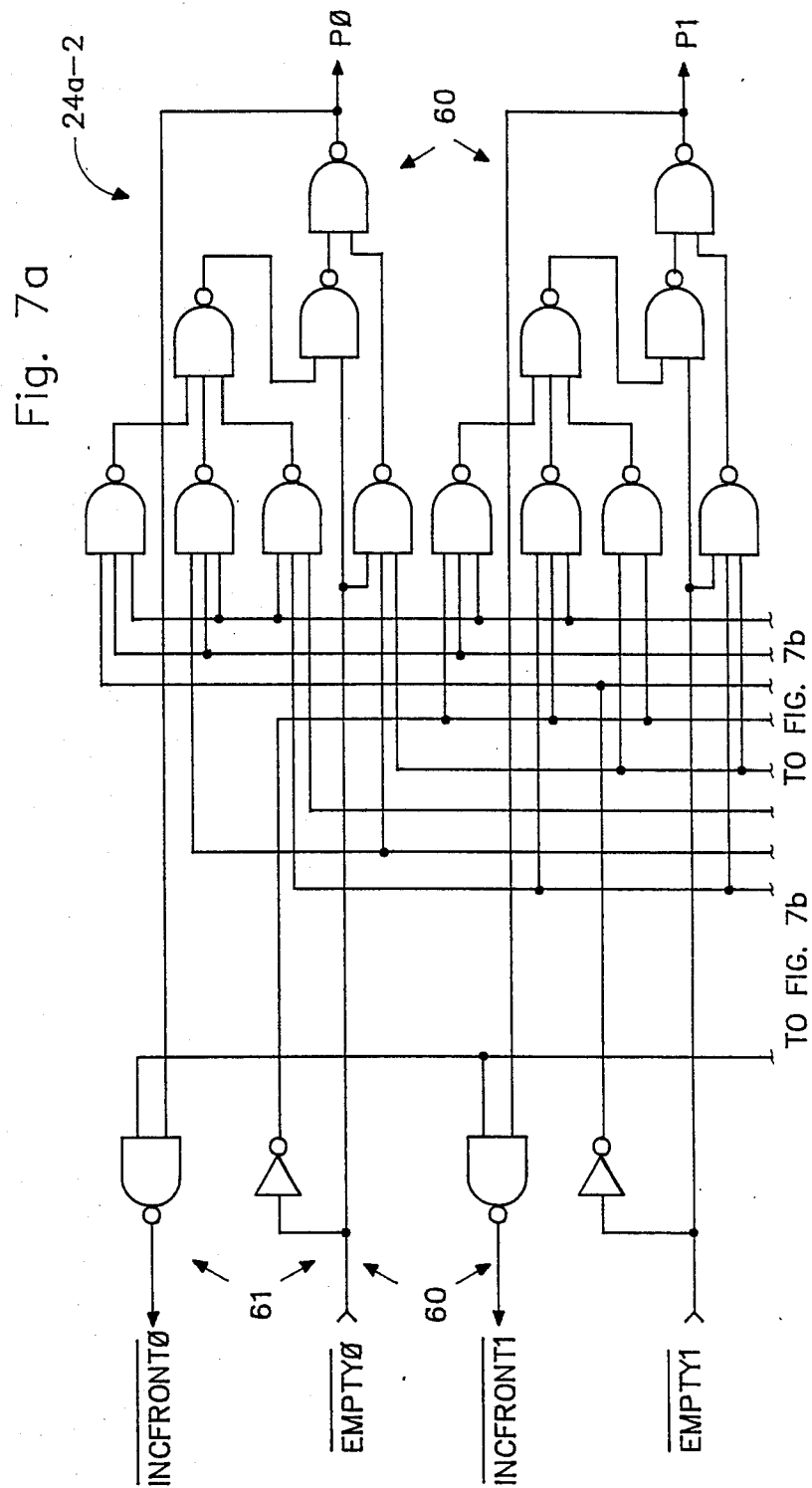
Figure 8A:
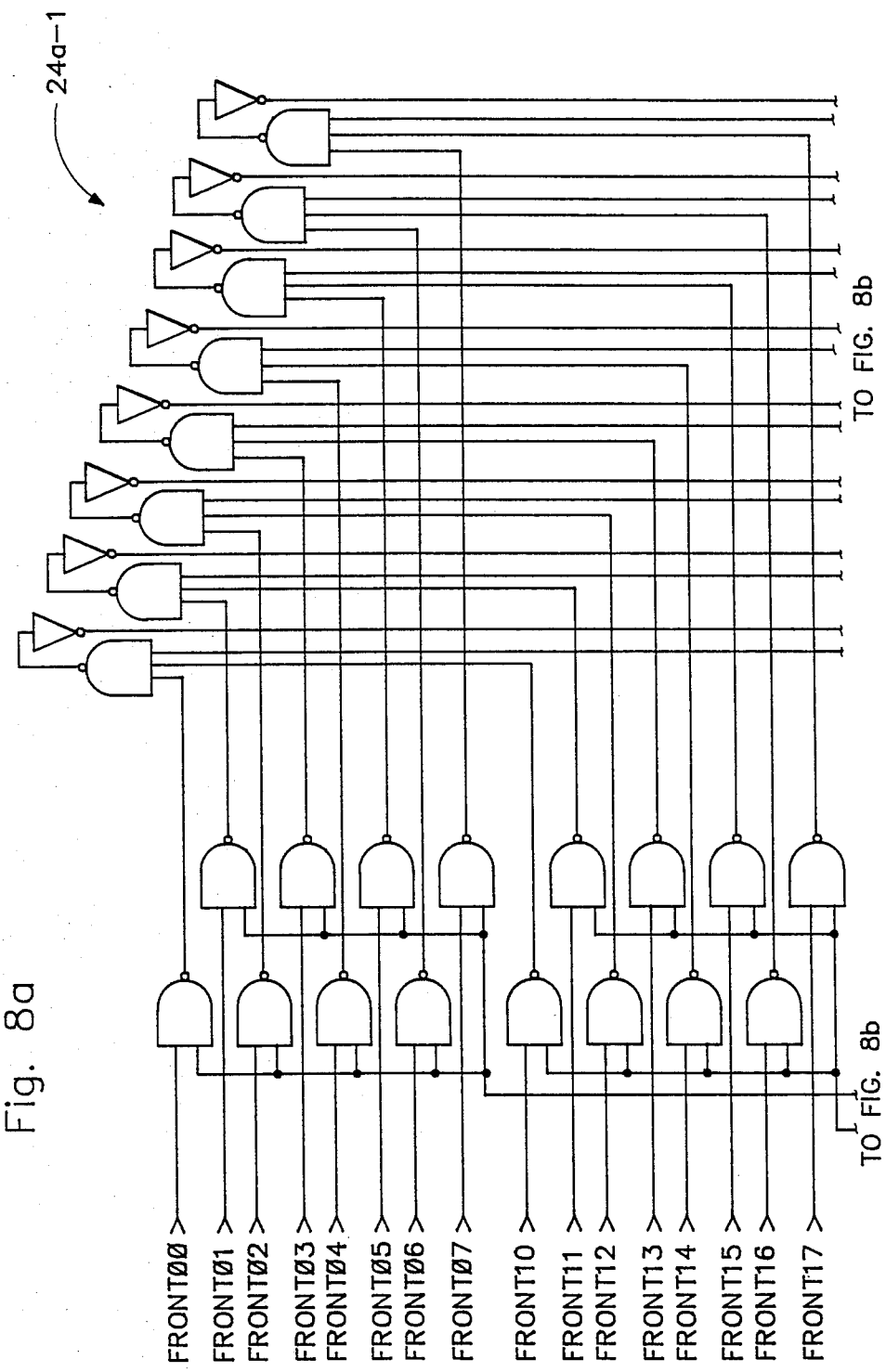
FIGS. 8a and 8b show a design of output arbitration data logic for use in the packet switching node of FIG. 3.
Figure 8B:
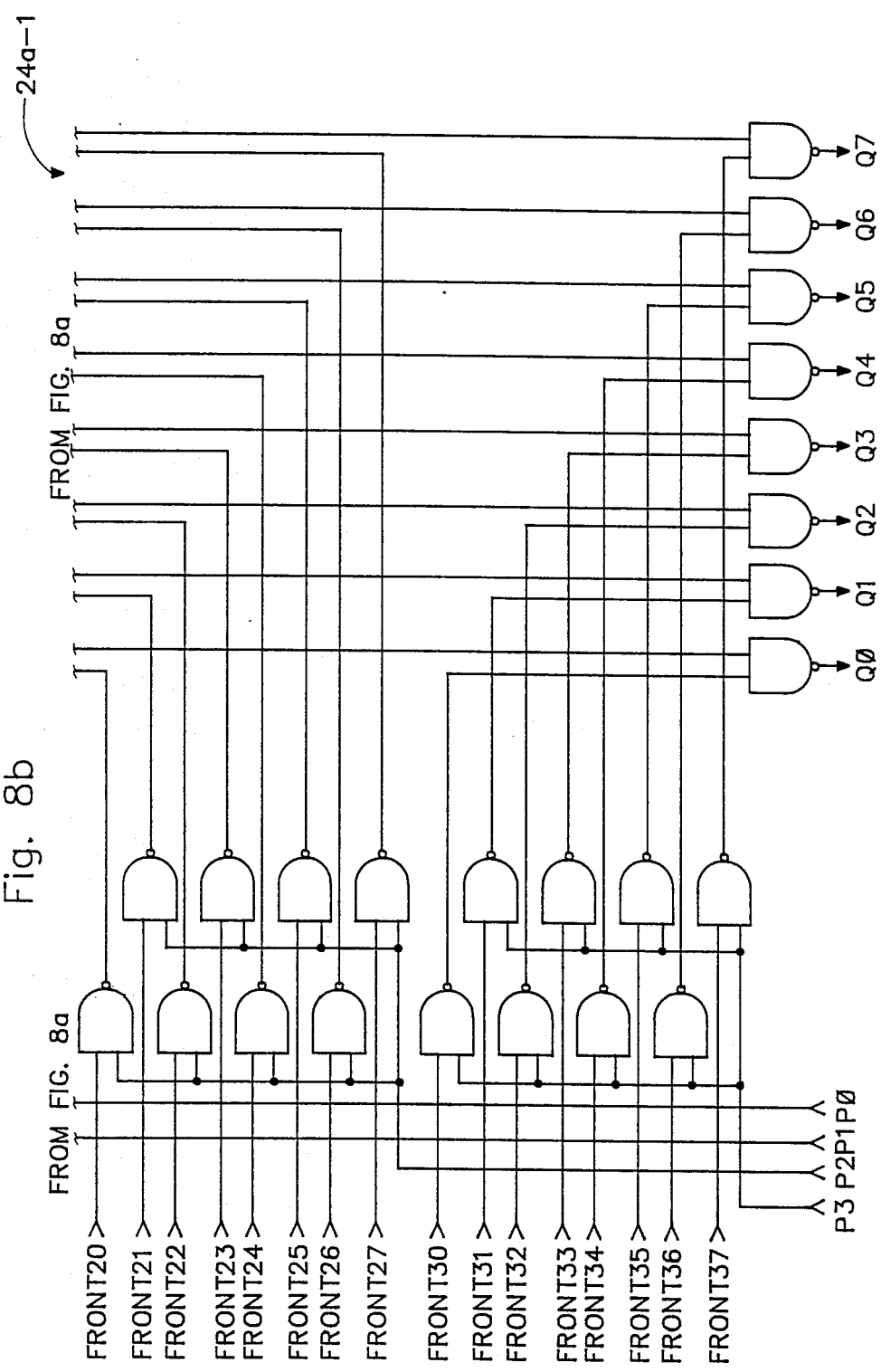

The output arbitrator control logic 24a-2 is shown in FIG. 7. FIG. 7 is comprised of FIGS. 7a and 7b, which should be joined to obtain the completed drawing as indicated with reference to FIG. 3 above. Each of the circuits comprising the output arbitrator control logic 24a–c is comprised of arbitration logic 60, incfront generation logic 61, priority counter 62 and priority counter enable logic 63. In operation, the arbitration logic 60 can receive requests from a total of four queues by way of "not empty" signals to transmit a packet from the corresponding output port 25. One queue is selected according to the priority indicated by the priority counter 62 and a request out signal is output therefrom. The priority counter 62 is incremented and thus the priority changes if a signal is received from the priority counter enable logic 63. Such a signal is produced only if the data packet with highest priority is transmitted, which is indicated by the receipt of a grant in signal. The incfront generation logic 61 sends a signal to increment the front pointer of the selected queue if a grant in signal has been received. The output of the arbitration logic 60 controls the output arbitrator data logic 24a-1. The output arbitrator data logic 24a-1 is shown in FIG. 8 and is comprised of an eight-input four-to-one multiplexer which connects the selected queue to this output port 25. FIG. 8 is comprised of FIGS. 8a and 8b and should be joined as indicated hereinabove with reference to FIG. 3 to obtain the completed drawing.

Figure 9:
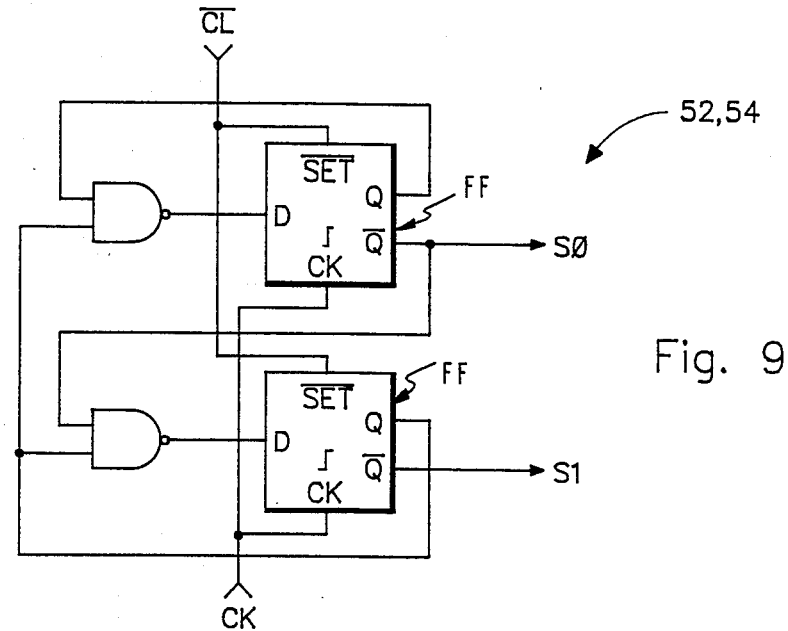
FIG. 9 shows a detailed logic diagram of a modulo 3 counter used in the queue of FIG. 6.
Figure 10:
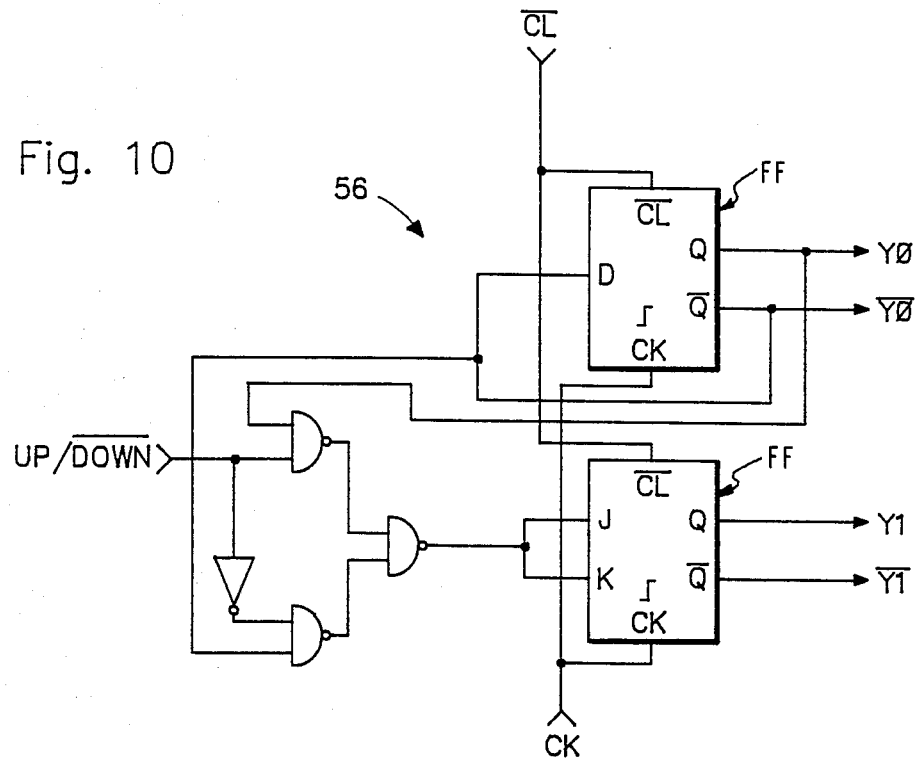
FIG. 10 shows a detailed logic diagram of a modulo 4 up/down counter used in the queue of FIG. 6.
Figure 11:
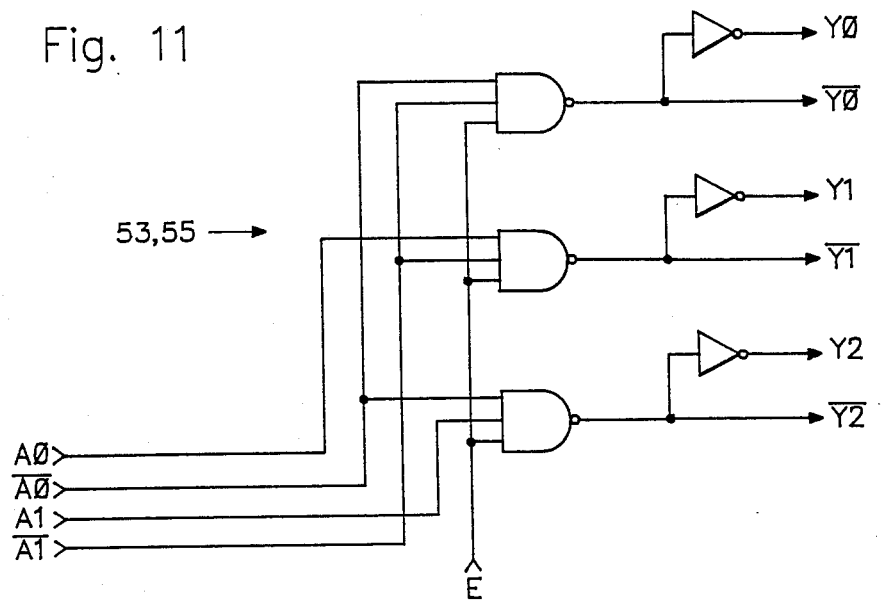
FIG. 11 shows a detailed logic diagram of a two-to-three demultiplexer used to implement the read and write decode logic of the queue of FIG. 6.
Figure 12:
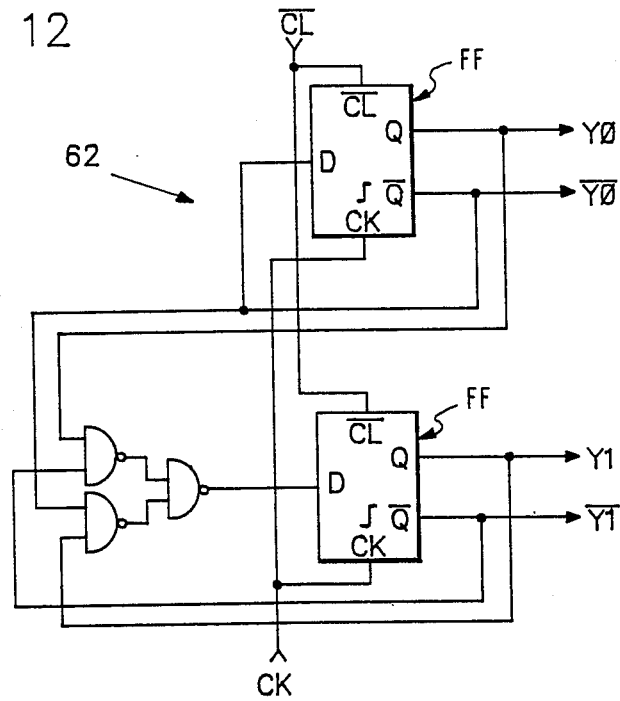
FIG. 12 shows a detailed logic of a module four up counter used in the priority counter employed in the output arbitrator control logic shown in FIG. 7.

FIG. 9 shows the detailed logic diagram of a modulo three counter used to implement the back pointer 52 and front pointer 54 in the queue 23 shown in FIG. 6. FIG. 10 shows the detailed logic diagram of the modulo four up/down counter 56 in the queue 23 shown in FIG. 6. FIG. 11 shows the detailed logic diagram of a two-to-three demultiplexer used to implement the write decode logic 53 and read decode logic 55 in the queue 23 in FIG. 6. FIG. 12 shows the detailed logic of a modulo four up-counter used to implement the priority counter 62 in the output arbitrator control logic 24a-2 shown in FIG. 7.

Figure 13:
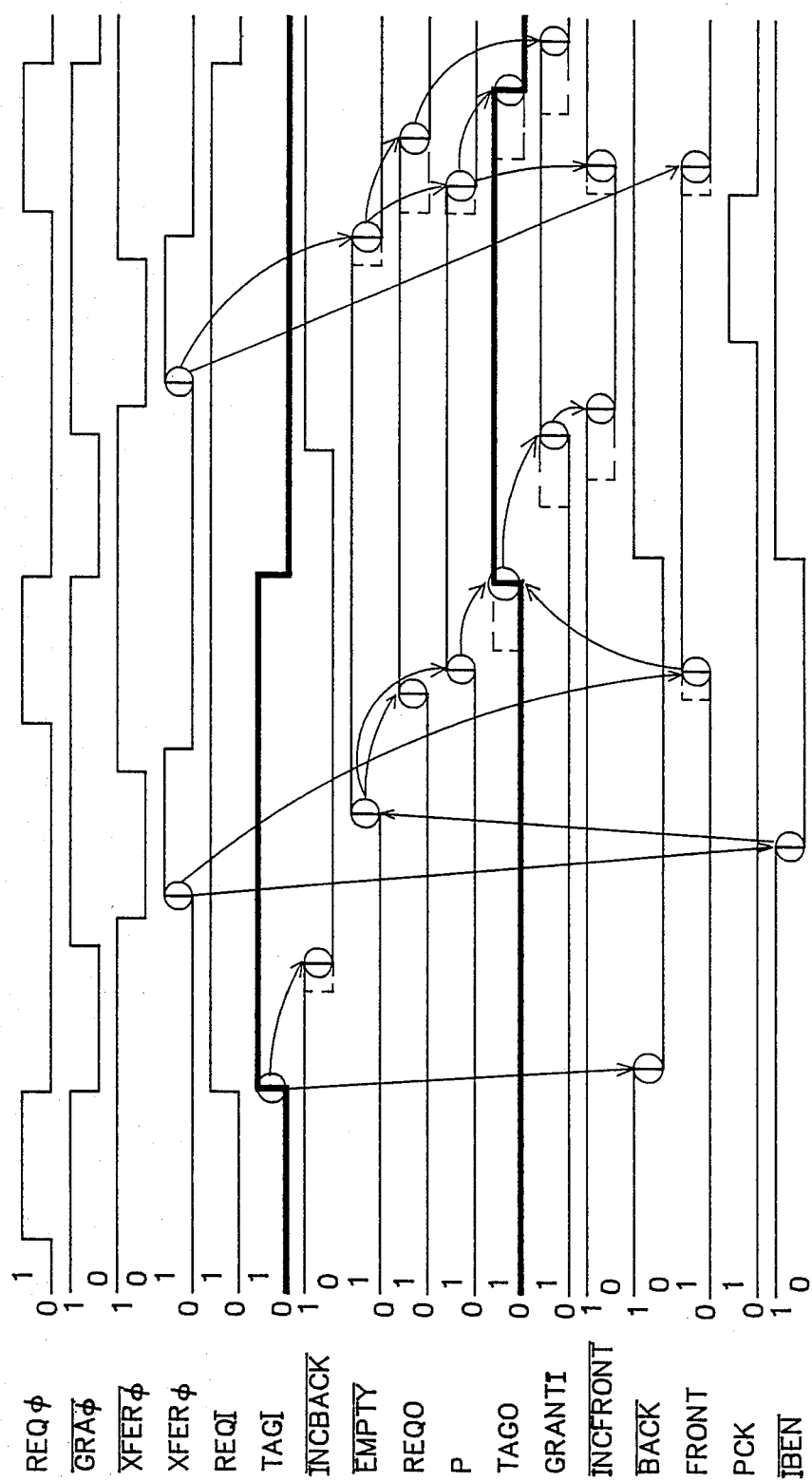

FIGS. 13 and 14 show timing diagrams for the packet switching node of FIG. 3. FIG. 13 shows the worst case timing analysis, when the queue is empty, and it accepts and transmits one data packet. FIG. 14 shows the worst case timing analysis when the queue has two data packets stored therein and it accepts one data packet, becomes full, and then transfers one data packet. The dashed lines indicate the soonest time that the particular signal could appear. The arrows are routed to events that occur in response to the happening of the event from which the arrows eminate.

The present invention also contemplates a method of processing applied data packets containing routing tag signals indicative of the output port destinations to which the data packets are to be applied. The method processes the data packets in order to route them to the appropriate output ports.

The method comprising the steps of sorting the data packets in accordance with the routing tag signals contained therein. The sorting function is performed by the queue selectors. The second step involves storing the data packets in predetermined queues associated with respective ones of each of the output ports in accordance with the routing tag signals.

The next step comprises arbitrating, or selecting, among data packets that have been stored in the queues that contend for the same output port. The arbitration process is performed by the output arbitrators. The final step involves applying, or routing, the selected data packet to the output port identified in the routing tag signal. This final step is also performed by the output arbitrators.

Thus, there has been described a new and improved packet switching node which may be employed as a switch node in a multi-processor or parallel computer application. The packet switching node eliminates the problem of contention between data packets arriving at an input port of the node whose destinations are different output ports. The packet switching node sorts applied data packets according to output port destination utilizing a plurality of queues coupled to each input port in order to reduce contention. The present invention also provides for packet switching node which has improved performance and higher throughput. The present invention also provides for a data processing method for use in packet switching nodes which operates to reduce contention and increase system throughput.

It is to be understood that the abovedescribed embodiments are merely illustrative of some of the many specific embodiments which represent applications of the principles of the present invention. Clearly, numerous and varied other arrangements may be readily devised by those skilled in the art without departing from the spirit and scope of the invention. In particular, interconnection networks employing the present invention may be used to connect telephone systems that communicate both data and voice information by way of data packets.

What is claimed is:

1. A packet switching node for processing applied data packets containing signals indicative of the output port destination to which said data packets are to be applied, said packet switching node comprising:
 a plurality of input ports;
 a plurality of output ports;
 a plurality of queue selection means individually coupled to corresponding ones of said plurality of input ports for routing data packets applied to each of said input ports in accordance with the output port destination of said data packets;

a plurality of queue sets individually coupled to corresponding ones of said plurality of queue selection means, each of said queue sets comprising a plurality of queues for storing and forwarding data packets applied thereto as a function of output port destination; and a plurality of output arbitration means individually coupled between corresponding ones of said plurality of output ports and the respective queue of each of said queue sets which store and forward data packets whose destinations are said corresponding output port, for transfering the data packets stored in said queues to said corresponding output port in accordance with a predetermined priority arbitration scheme.

2. A packet switching node for processing applied data packets containing signals indicative of the output port destination to which said data packets are to be applied, said packet switching node comprising:

a plurality of input ports;

a plurality of output ports;

a plurality of queue selection means for routing data packets applied to each of said input ports in accordance with the output port destination of said data packets, each of said queue selection means having an input coupled to corresponding ones of said plurality of input ports, each of said queue selection means having a plurality of outputs;

a plurality of queue sets individually coupled to corresponding ones of said plurality of queue selection means for storing and forwarding data packets applied thereto as a function of output port destination, each of said queue sets comprising a plurality of queues, each of said queues having an input and an output, the inputs of each of said queues being coupled to the outputs of said corresponding queue selection means; and a plurality of output arbitration means for transfering the data packets stored in associated queues of each of said queue sets to a corresponding one of said plurality of output ports in accordance with a predetermined priority arbitration scheme, each of said output arbitration means having an output coupled to said corresponding output ports, each of said output arbitration means having a plurality of inputs coupled to the outputs of respective queues of each of said queue sets which store and forward data packets whose destinations are said corresponding output port.

3. A packet switching node for processing applied data packets containing routing tag signals indicative of the output port destination to which said data packets are to be applied, said packet switching node comprising:

a plurality of input ports;

a plurality of output ports;

a plurality of queue sets individually coupled to said plurality of input ports, each set comprising a plurality of queues which individually process and store data packets whose destinations are a particular one of said output ports;

queue selection logic coupled between each of said input ports and the corresponding plurality of queue sets, for routing applied data packets arriving at said input port to corresponding ones of said queues in accordance with said routing tag signals; and output arbitration logic coupled between each output port and respective queues of each of said plurality of queue sets which process data packets whose destinations are said output port for applying the data packets associated with that output port stored in each of said respective queues to that output port in accordance with a predetermined priority arbitration scheme.

4. A method of processing applied data packets containing routing tag signals indicative of the output port destinations to which said data packets are to be applied in order to route said data packets to the appropriate output ports, said method comprising the steps of:

sorting said data packets in accordance with said routing tag signals contained therein:

storing said data packets in predetermined queues associated with respective ones of each of said output ports in accordance with said routing tag signals;

selecting among data packets that have been stored in said queues that contend for the same output port; and applying said selected data packet to the output port identified in said routing tag signal.

5. A method of processing applied data packets containing routing tag signals indicative of the output port destinations to which said data packets are to be applied in order to route said data packets to the appropriate output ports, said method comprising the steps of:

sorting said data packets in accordance with said routing tag signals contained therein;

storing said data packets in queues corresponding to the output port destination thereof contained in said routing tag signals;

arbitrating among data packets which have been stored in each of said queues that correspond to a particular one of said output ports; and routing the data packets selected during the the arbitration process to said output ports identified in said routing tag signals.

6. A method of processing applied data packets containing routing tag signals indicative of the output port destinations to which said data packets are to be applied in order to route said data packets to the appropriate output ports, said method comprising the steps of:

sorting said data packets in accordance with said routing tag signals contained therein;

storing said sorted data packets in predetermined queues based upon the output port destination thereof identified in said routing tag signals;

arbitrating among data packets stored in said queues which are destined for the same output port; and routing the data packets selected during the arbitration process from said queues to said output ports identified in said routing tag signals.

* * * * *